Patented Mar. 6, 1923.

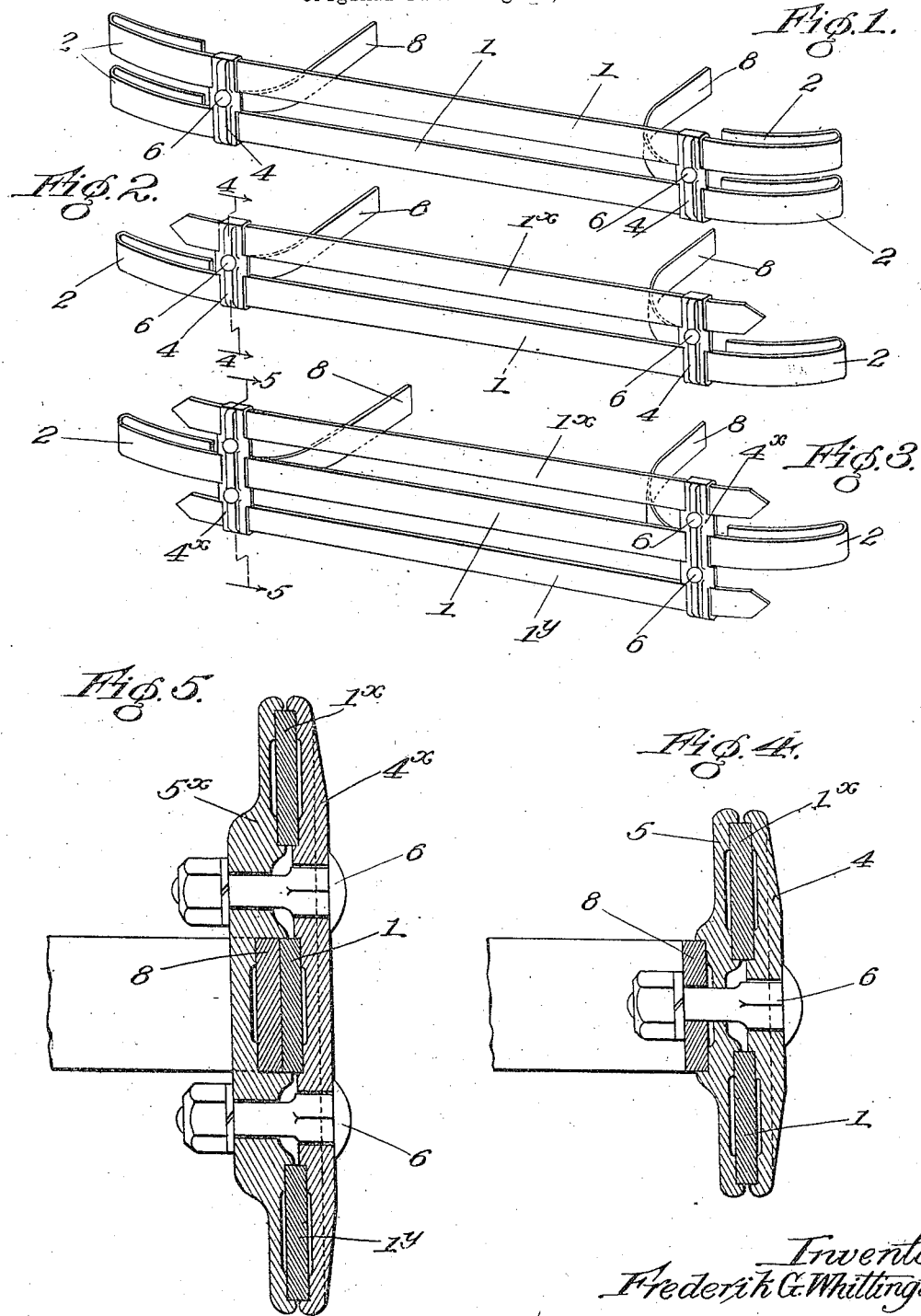

1,447,703

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

AUTOMOBILE BUMPER.

Continuation of application Serial No. 490,360, filed August 6, 1921. This application filed October 15, 1921. Serial No. 507,941.

*To all whom it may concern:*

Be it known that I, FREDERIK G. WHITTINGTON, a citizen of the United States, residing in Evanston, in the county of Cook and State of Illinois, have invented certain new and useful Improvements in Automobile Bumpers, of which the following is a specification, reference being had to the accompanying drawings, forming a part thereof.

This application is a continuation of my application, serial No. 490,360 filed August 6, 1921, and allowed August 31st, 1921. The purpose of the present invention which one of its forms is shown in said application No. 490,360, is to provide an improved construction of a plural spring bar bumper for automobiles. It consists in the elements and features of construction shown and described, as indicated in the claim.

In the drawings:—

Figure 1 is a perspective view of a bumper embodying this invention in one form.

Figure 2 is a similar view of a modification.

Figure 3 is a similar view of another modification.

Figure 4 is a section at the line, 4—4, on said Figure 1 or Figure 2.

Figure 5 is a section at the line, 5—5, on Figure 3.

The bumper shown in Figures 1 and 4 of the drawings comprises two identically formed spring bars, 1, 1, each having its opposite ends reflexed to form loop ends, 2, the two spring bars being mounted for extending reversely of the vehicle in substantially the same vertical plane, and spaced apart in that plane; and the reflexed loop ends of the two bars extend directly behind the forward impact portions of the bars respectively, so that said loops of the two bars at each end are substantially parallel to each other,—that is, they are spaced apart from each other substantially the same distance as the two bars are spaced apart at their impact portions, and said loop ends of the two bars are therefore not connected together but constitute independent loops for guarding the wheel. These two spring bars, 1, 1, having the loop ends, 2, 2, as described, are secured together for mounting on the vehicle, by means of vertical cross ties which are preferably in the form of two-membered clamps, 4, 5, between which at the upper and lower ends, the upper and lower bars, 1, 1, are seated in the opposed faces of said clamped members and clamped together, said clamped members being recessed in their said opposed faces to form positioning seats for the spring impact bars. The clamping is effected by bolts, 6, engaging the two clamp members between the two spring impact bars. For convenience of assembling and simplicity of construction, the bolts, 6, 6, which secure the two clamp members and clamp them together for clamping the spring impact bars between them, serve also for securing the impact member as a whole to the supporting arms, 8, 8, by which the bumper is mounted on the vehicle side bars.

Figure 2 shows a modification of the invention which consists in terminating one of the two spring impact bars, designated in Figure 2 as $1^x$, just outward from the cross ties, 4, 5. The cross ties and securement of the bars together, and to the supporting spring arms, 8, 8, which are identical with the form shown in Figure 1, as indicated by the identical sectional view of Figure 4, made on either Figure 1 or Figure 2.

Figures 3 and 5 show a further modification consisting in adding to the form shown in Figure 2, a third spring bar, $1^y$, the two bars, $1^x$, and $1^y$, being equally spaced respectively above and below the bar, 1. The clamp device in this form follows the same general rule of construction as in the other forms, in that it consists of two clamp members, $4^x$ and $5^x$, having in their opposed inner faces seats for each of the three bars, 1, $1^x$ and $1^y$, and in having the bolt which clamps the two clamp members together for securing them upon the impact bars and securing the bars together, extending between the said impact bars respectively. In this form the spring-supporting arms, 8, 8, instead of being engaged by the bolts, are clamped onto the middle one of the three impact bars, the forward ends of said supporting bars being lodged directly in the rear of said middle bar.

Referring to the form shown in Figures 1 and 2, and in the section Figure 4, it will be observed that the space between the two impact bars is less than the width of either bar, and particularly is less than the width of the spring supporting bar whose forward end is positioned between the two impact bars. The result of this arrangement of parts as to their respective dimensions, is that in clamping the parts together, the width of the supporting arm, 8, lapping past the proximate marginal portions of the two impact bars causes a direct clamping to be effected between said bars respectively, thereby avoiding a tendency to spring the clamp member as it might be sprung in the interval between the two impact bars was more than the width of the supporting arm, 8.

I claim:—

An automobile bumper comprising an impact member consisting of a plurality of flat spring impact bars set edgewise all in substantially the same vertical plane with vertical cross bars tying the impact bars together near their ends; one or more of the impact bars being extended beyond the cross bars and at the extended part curved rearward and then reflexed inward back of the curved part to form inwardly-open loops with free and unconnected ends, and supports for the impact member attached to the cross bars.

In testimony whereof, I have hereunto set my hand at Chicago, Illinois, this 5th day of October, 1921.

FREDERIK G. WHITTINGTON.